United States Patent [19]

Hoisington

[11] Patent Number: 5,291,765
[45] Date of Patent: Mar. 8, 1994

[54] BICYCLE LOCK BRACKET

[76] Inventor: Gary Hoisington, 8411 N. Port, Huntington Beach, Calif. 92648

[21] Appl. No.: 991,576

[22] Filed: Dec. 16, 1992

[51] Int. Cl.⁵ .............................................. B62H 5/00
[52] U.S. Cl. ......................................... 70/233; 70/18; 70/49
[58] Field of Search ................... 70/14, 18, 19, 30, 49, 70/57, 58, 225, 226, 233, 238

[56] References Cited

U.S. PATENT DOCUMENTS

| | | | |
|---|---|---|---|
| 3,550,409 | 12/1970 | Pariser | 70/238 |
| 3,824,540 | 7/1974 | Smith | 70/233 |
| 4,023,387 | 5/1977 | Gould | 70/49 X |
| 4,028,916 | 6/1977 | Pender | 70/49 X |
| 4,055,060 | 10/1977 | Bellino | 70/238 X |
| 4,112,720 | 9/1978 | Green | 70/30 X |
| 4,188,808 | 2/1980 | Valdez | 70/233 |
| 4,407,146 | 10/1983 | Nielsen, Jr. | 70/18 X |
| 4,571,965 | 2/1986 | LeRoux | 70/233 X |
| 4,577,477 | 3/1986 | Olshausen | 70/233 X |
| 4,803,857 | 2/1989 | Hall et al. | 70/233 X |

OTHER PUBLICATIONS

1 Sheet of Drawings of Prior Art Device.
1 Sheet of Photographs of Prior Art Device.

Primary Examiner—Peter M. Cuomo
Assistant Examiner—Suzanne L. Dino
Attorney, Agent, or Firm—Robert G. Crouch

[57] ABSTRACT

A bicycle lock bracket is formed by an elongated metal strap having an aperture in each end and folded in a loop with its opposite ends overlapped and juxtaposed with the apertures aligned. The strap is adapted to encircle a bicycle frame tube or other tube, rod or post, so that a cable lock body is held securely in place between the strap and the frame tube. The juxtaposed ends of the strap are attached together by bolts or other fasteners so that the cable lock body is tightly retained within the bracket when the lock is open. Inserting the cable through the aligned apertures into the lock body secures the strap, lock body and cable to the mounting tube.

14 Claims, 2 Drawing Sheets

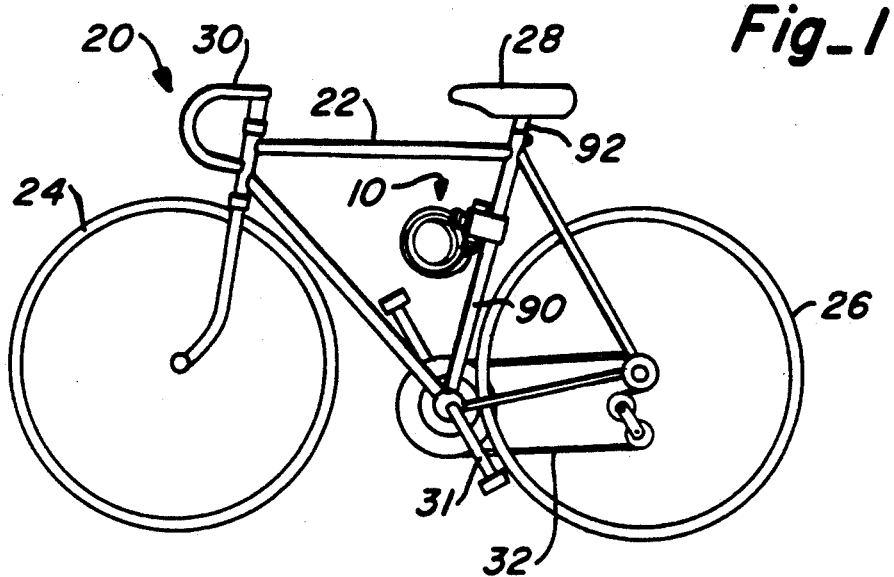
Fig_1
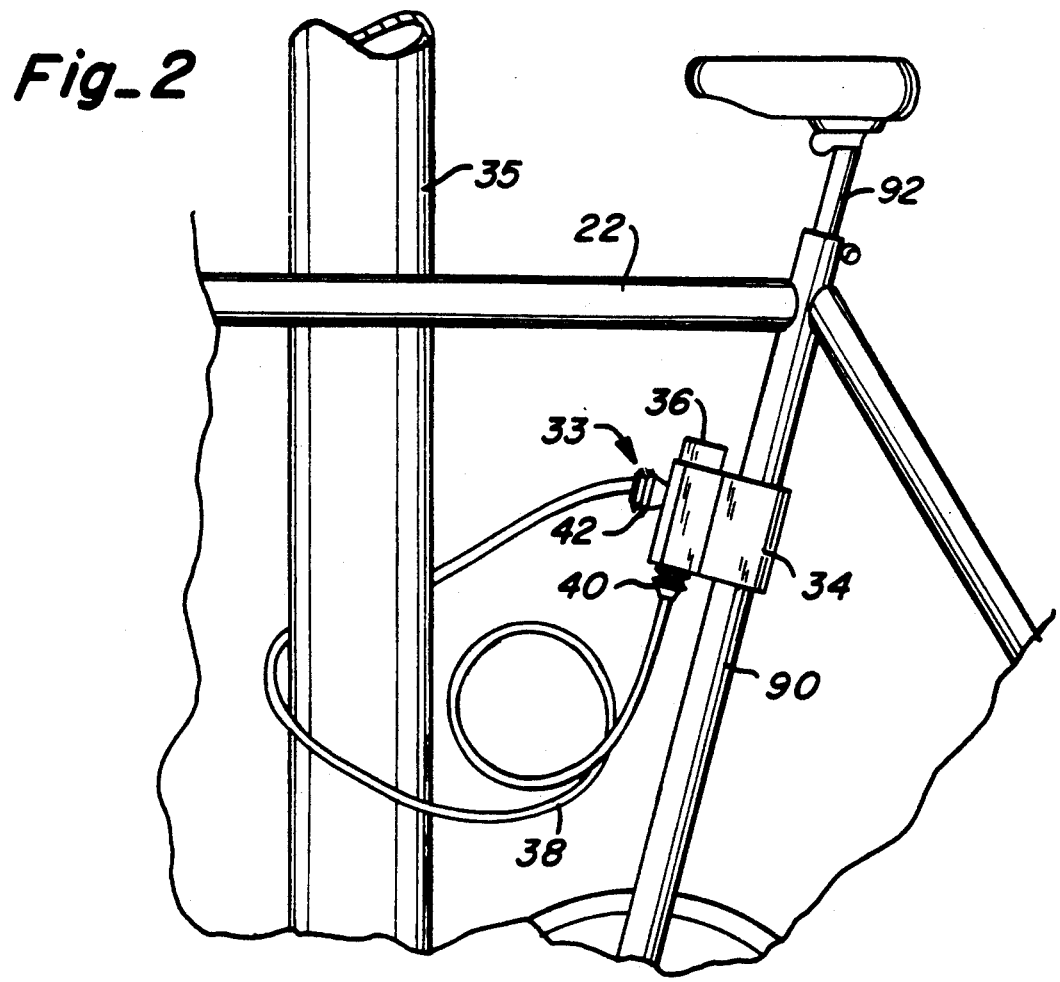
Fig_2

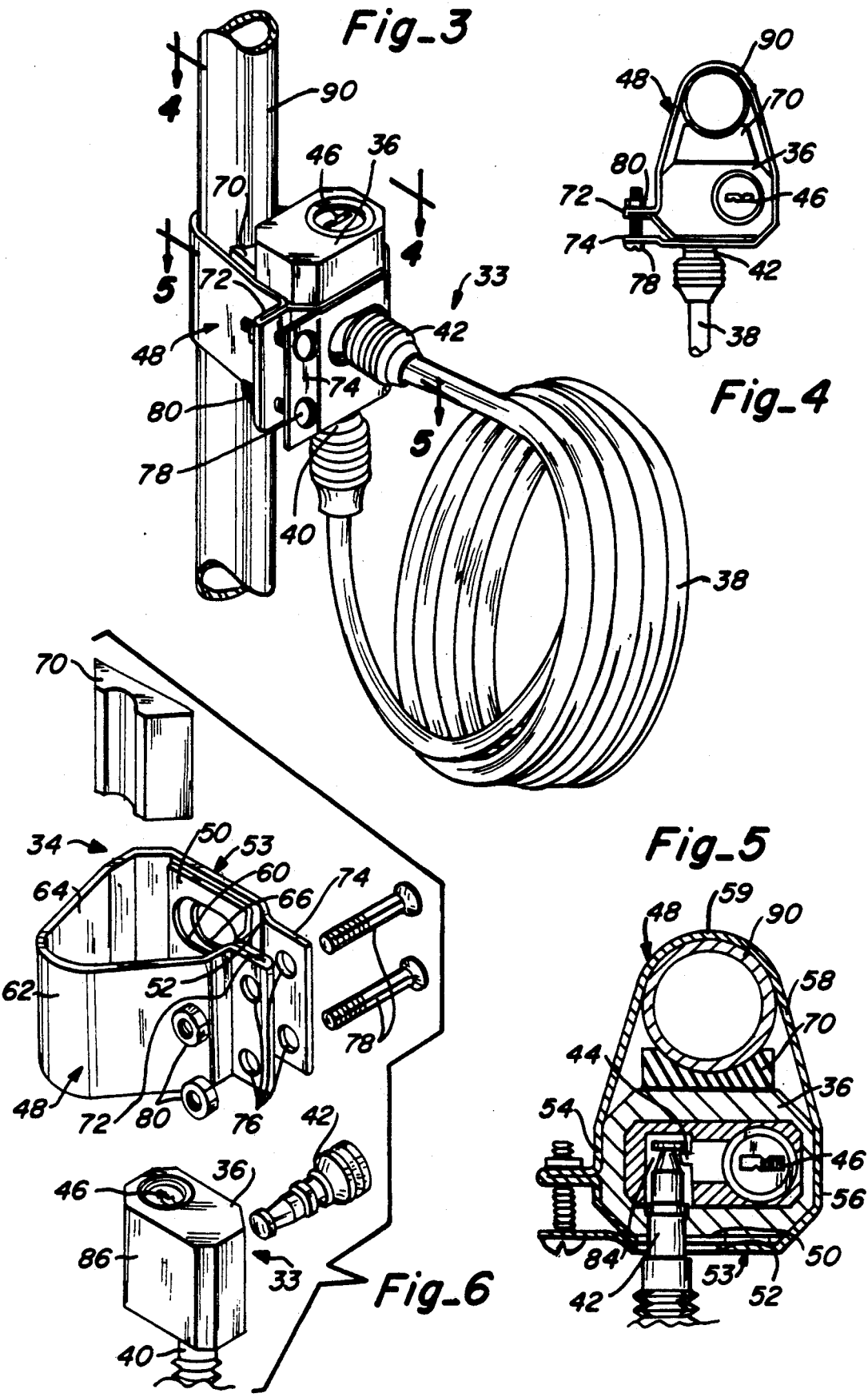

BICYCLE LOCK BRACKET

BACKGROUND OF THE INVENTION

1. Field of the Invention

The present invention relates to locks and more specifically to locks finding particular but not exclusive utility for bicycles. More particularly, the present invention pertains to an improved cable lock and bracket for securing a cable lock to a bicycle both for storage and to secure the bicycle to a fixed object.

2. Discussion of the Prior Art

Bicycle locks include two primary types of locks. The first is a solid U-shaped padlock-type lock such as is manufactured by Kryptonite, under the name Kryptonite Locks. The U-shaped portion or shackle is typically made of hardened steel. The lock is carried on the bicycle in a holder or bracket.

A second common type of bicycle lock is a cable lock. The cable is usually composed of twisted strands of steel wire encased in a plastic or rubber cover. The cable is normally coiled for convenience of storage. One end of the cable is permanently fixed to a lock body or casing. The second end of the cable includes a locking pin, or bolt or tip, which may be attached into and removed from the lock body when the locking mechanism is activated or deactivated. The locking mechanism typically includes a key operated lock, although some cable lock devices utilize a combination lock.

Various brackets exist in the bicycle market for both types of locks. These brackets are conventionally attached to the bicycle frame by a bolt. In such devices, securing the lock to the bracket does not secure the lock to the bicycle frame. For this reason, the lock must be removed from the bracket and the shackle or cable threaded through the bicycle frame to secure the lock to the frame and, in turn, to secure the bicycle frame to a permanent object. Furthermore, since the lock body is not retained by the bracket when the lock is disengaged, the bicycle rider normally holds the lock body while threading the cable through the frame and around the permanent object. Accordingly, the object of this invention is to provide an improved and convenient apparatus and method for securing bicycles with cable locks.

SUMMARY OF THE INVENTION

The present invention is embodied in an improved cable lock bracket which may be secured to a support such as a frame tube of a bicycle or to an external tubular support. The bracket, when secured to both the bicycle and the cable lock, prevents the cable lock and bracket from being removed from the bicycle. The bracket comprises an elongated metal strap having first and second ends wherein the strap is folded into a loop which can be passed around the bicycle frame tube so that the first and second ends of the strap overlap in juxtaposed relation. The first and second ends of the strap have formed therein first and second apertures, respectively, which are substantially aligned so that the cable may be inserted therethrough and into the lock body, thereby securing the lock to the bracket and hence to the bicycle frame.

Another aspect of the present invention allows the cable lock to be used to secure the bicycle frame to a stationary object by placing the cable around or through the stationary object and reinserting the cable, through the bracket, into the cable lock body.

Another aspect of the present invention involves fitting a lock casing of a cable lock within the encircled strap between the bicycle frame tube and the strap. A receptacle on the lock casing is held in substantial alignment with the aligned openings of the strap to allow a bolt or tip on the end of the lock cable to be inserted through the openings and into the receptacle of the lock casing thus securing the two ends of the strap together and thereby securing the strap and lock to the bicycle.

Other aspects, features and details of the present invention can be more completely understood by reference to the following detailed description of the preferred embodiment, taken in conjunction with the drawings, and from the appended claims.

DETAILED DESCRIPTION OF THE DRAWINGS

FIG. 1 is a side view of a bicycle having a cable lock and a lock bracket embodying the present invention mounted thereon.

FIG. 2 is an enlarged partial view of a bicycle frame with the cable lock and lock bracket of the present invention mounted thereon.

FIG. 3 is an enlarged partial view of the present invention installed on a bicycle frame tube with a cable lock retained therein.

FIG. 4 is a sectional view of the present invention taken substantially in the plane of line 4—4 on FIG. 3.

FIG. 5 is an enlarged sectional view of the present invention taken substantially in the plane of line 5—5 on FIG. 3.

FIG. 6 is an exploded view of the bracket embodying the present invention and a partial view of the cable lock associated therewith.

DESCRIPTION OF THE PREFERRED EMBODIMENT

The bicycle lock and bracket assembly 10 embodying the present invention is shown in FIG. 1 in its preferred location on a bicycle 20. The bicycle 20 conventionally includes a frame 22, a front wheel 24, a rear wheel 26, a seat 28, a handle bar 30, a pedal and crank assembly 31, and a chain 32. The lock and bracket assembly 10 utilizes a standard cable lock 33 mounted on a unique bracket 34 and the assembly attached to a bicycle or support for either convenient storage or securing the bicycle to a stationary object 35 (FIG. 2). The stationary object 35 may be a tree, a light pole, a fence or any type of bike rack.

Bike racks for securing parked bikes come in all shapes and sizes and although they are often movable, they are heavy and awkward to move. For the purpose of securing a bicycle these bike racks are sufficiently immovable. Of course, any other heavy, fixed object may also be sufficient to secure a bicycle if the object will permit the standard cable lock 33 to pass around or through it. The previously mentioned bike racks may contain a series of metal bars or other sections which permit the cable lock 33 to pass through the rack and secure the lock thereto.

The cable lock 33 includes a lock casing or body 36 and a cable 38 (FIGS. 2-6). The cable has a first end 40 which is fixed to the lock body 36 and a second end with a bolt or tip 42 which is removably attachable to the lock body by a locking mechanism 44 (FIG. 5). Typically located on the lock body is a key receptacle 46 into which a key (not shown) may be placed to deactivate the locking mechanism to open the lock. The key and key receptacle 38 can be referred to as a deactivation means.

As is shown in FIG. 6, the bicycle lock bracket 34 for securing the lock 33 to the bicycle 20 comprises an elongated, folded strap 48 having a first end 50 and a second end 52. The strap is preferably formed of hardened metal so that it substantially retains its shape once folded. The elongated strap 48 is folded in a loop so that the first end 50 overlaps and is juxtaposed with the second end 52. When the loop is viewed in cross section (FIGS. 4 and 5), the loop is v-shaped with the tips or ends of each leg of the "v" folded over to overlap with each other. Further, the vertex of the "v" is rounded to mate with a tubular support.

An overlapping section 53 of the loop comprises the overlapping first end 50 and second end 52. Connected to this overlapping section 53 at each end thereof are first and second perpendicular sections 54 and 56. Each of the perpendicular sections are substantially perpendicular to the overlapping section 53 and substantially parallel to each other. The perpendicular sections 54 and 56 are connected together by a v-shaped section 58 to complete the loop. As stated above, the v-shaped section has a rounded vertex 59 to mate with a tubular support.

At the first end 50 of the elongated strap 48 is formed a first elongated aperture or opening 60 in the strap 48. The opening 60 is formed from an exterior surface 62 of the looped strap to an interior surface 64 of the looped strap (FIG. 6) Similarly, a second elongated aperture or opening 66 is formed at the second end 52 of the strap. The openings 60 and 66 of the looped strap 48 are formed at such positions on the folded strap so that they are substantially aligned with each other. Preferably, the first and second openings 60 and 66 are oval-shaped so that the openings need not be perfectly aligned to allow a portion of the lock to pass therethrough. Thus, the tip 37 of the cable lock 33 can be readily inserted through the two openings 60 and 66 to thereby secure the ends 50 and 52 of the strap 48 together. With the cable lock inserted through the openings thusly, the elongated strap 48 will be held together in this substantially aligned position.

As mentioned previously, the stiffness of the strap helps to maintain the shape of the strap. However, to hold the lock body securely in place within the folded strap 48 even when the cable lock 33 is not locked, the bracket has a rubber spacer 70 and an attaching means for removably attaching the first end 50 of the strap 48 to the second end 52. This attaching means is in addition to the above-described arrangement of aligned openings with a portion of the lock passing therethrough. This attaching means preferably comprises a pair of facing flanges 72 and 74 and a fastening means for fastening the two facing flanges together. The first facing flange 72 is formed to protrude outward from the first perpendicular section 54 near the first end 50 of the strap 48 adjacent to the first opening 60. The second facing flange 74 is formed at the second end 5 of the strap 48 adjacent to the second opening 66.

In the preferred embodiment, each facing flange 72 and 74 has a pair of holes 76 formed therein to allow a pair of bolts 78 to pass therethrough (FIG. 6). A pair of nuts 80 are placed on the bolts 78 to fasten the first and second facing flanges 72, 74 together. Of course, this fastening means, including the holes 76, bolts 78, and nuts 80, is but one example of the many possible means to fasten the two flanges together. Similarly, the two flanges 72 and 74 together with the fastening means are only one of many possible means for attaching the first and second ends 50 and 52 of the strap 48 together.

As can be seen in FIG. 6, the lock body 36 of the cable lock 33 is placed within the lock bracket 34 and sandwiched between the bicycle frame and the strap 48 so that a tip receptacle 84 on the lock body 36 is substantially aligned with the substantially aligned first and second openings 60 and 66. With the tip receptacle 84 in this position, the tip 42 of the cable 38 can be inserted through the two openings 60 and 66 and into the lock body 36 to engage the locking mechanism 44.

To prevent scratching of the bicycle, the rubber space 70 is inserted between the lock body 36 and the bicycle frame and formed so that it rests squarely against a flat back surface 86 of the lock body 36. Further, the rubber spacer 70 is formed to fit snugly against a tube 90 of the bicycle frame 22 or some other support. Alternatively, the portion of the bicycle frame to which the bracket 34 is attached may be the seat tube 92 or the handlebar 30. Either of these latter two possibilities would provide reduced security since the bracket could be removed by disconnecting the seat 28 or handlebar 30, or by sliding the bracket 30 off of the end of the handlebar 30. Security can be increased by placing the bracket 34 on one of the previously discussed frame tubes 90. Since frame tubes 90 are not uniform in diameter due to different styles and models of bicycles, the rubber spacer 70 may be provided in a variety of sizes.

The operation and use of the bicycle lock bracket 34 of the present invention is as follows. A commercially-available standard cable lock 33 is placed within the bracket 34 which is located on the vertical frame tube 90 of the bicycle 20. The cable lock 33 is oriented so that the key receptacle 46 which deactivates the locking mechanism is accessible from above for the convenience of the bicycle rider. The fixed end 40 of the cable 38 which is permanently attached to the lock body 36 protrudes from the bottom of the lock body and thus is oriented downward. Most standard cable locks 33 provide the cable 38 with a natural coil for ease of storage (FIG. 3).

The lock body 36 is tightly held in place within the bracket 34 by the bolts 78 and the nuts 80. Thus, when locking and unlocking the lock 33, the lock body 36 remains fixed on the bike within the bracket 34 and need not be held or handled. This relieves the rider of the need to hold the lock body 36 during these operations, making the present invention easier for the operator to use.

When riding the bicycle, or at any other time when it is desired to secure the bicycle, the cable 38 is inserted through the substantially aligned openings 60 and 66 of the bracket 34. The tip 42 of the cable 38 is engaged by the locking mechanism 44 automatically when placed into the tip receptacle 84 which is itself substantially aligned with the openings 60 and 66 of the bracket 34. The remainder of the cable 38 remains coiled and does not interfere with the operation of the bicycle.

When it is desired to secure the bicycle to a stationary object 35, the locking mechanism is deactivated by placing and turning a key (not shown) in the key receptacle 46. The tip 42 of the cable 38 is released from the lock body 36 and may be removed from the substantially aligned openings 60 and 66. The cable 38 may then be threaded through or placed around an adjacent stationary object 35. The stationary object 35 may be divided into sections to allow the cable 38 to be placed around one or several of the sections. The cable 38 is then re-inserted through the substantially aligned openings 60 and 66 and into the tip receptacle 84 of the cable lock 33. The bicycle 20 is now secured to the stationary object 35. It is not necessary to thread the cable lock through or around the frame 22 of the bicycle 20 as was the case with the prior art devices. This is because the lock is itself already secured to the frame by the inherent nature of the present invention. Because the cable lock has been placed through the substantially aligned openings 60 and 66 of the bracket 34, the lock cannot be removed from the bicycle without cutting through the metal strap, cutting through the cable or deactivating the locking mechanism. Thus, the ability to secure a bicycle without threading a cable through the frame is one of the major advantages of the present invention.

A presently preferred embodiment of the present invention has been described above with a degree of specificity. It should be understood, however, that this degree of specificity is directed toward the preferred embodiment. For example, the present invention could be used to secure a bracket and lock to other devices than a bicycle. Accordingly, the invention itself is defined by the scope of the appended claims.

I claim:

1. A bracket for the attachment of a bicycle lock, having a lock body and a cable secured at one end to said lock body and having a lock tip at its free end, to a tubular member of a bicycle, comprising:
    an elongated strap having a first end and a second end and having an inner side and an outer side, said strap being formed to completely encircle the lock body and the tubular member of the bicycle with said first and second ends in overlying juxtaposed relation so that the outer side of the first end is adjacent to the inner side of the second end, said first end defining a first opening through the strap and said second end defining a second opening through said strap, said strap being formed to substantially align said first opening with said second opening to receive the lock tip of the bicycle lock cable with said tip extending through each of the first and second openings and into said lock body to thereby secure said first end to said second end of said strap and thereby said bicycle lock to said tubular member of the bicycle.

2. A bracket as defined in claim 1 wherein the strap is composed of metal.

3. A bracket as defined in claim 1 wherein the strap is composed of a single unitary piece of material.

4. A bracket as defined in claim 1, further comprising:
    means located on the elongated strap for removably attaching the first end to the second end.

5. A bracket as defined in claim 2 wherein the strap is encased in a protective coating to reduce scratching of the bicycle.

6. A bracket for the attachment of a bicycle lock, having a lock body and a cable, to a tubular member of a bicycle, comprising:
    an elongated strap having a first end and a second end, the strap being formed to encircle the lock body and the tubular member of the bicycle and to overlap the first and second ends, the first end being provided with a first opening through the strap and the second end being provided with a second opening through the strap, the strap being formed to substantially align the first opening with the second opening to permit a portion of the bicycle lock to pass through each of the first and second openings and thereby secure the first end to the second end and secure the strap and the bicycle lock to the tubular member of the bicycle; and
    a spacer located within the encircled strap.

7. A bracket as defined in claim 6 wherein the spacer is composed of a flexible, rubber material.

8. A bracket as defined in claim 6 wherein said spacer is located between said tubular member and said lock body.

9. A bracket for the attachment of a bicycle lock, having a lock body and a cable, to a tubular member of a bicycle, comprising:
    an elongated strap having a first end and a second end, the strap being formed to encircle the lock body and the tubular member of the bicycle and to overlap the first and second ends, the first end being provided with a first opening through the strap and the second end being provided with a second opening through the strap, the strap being formed to substantially align the first opening with the second opening to permit a portion of the bicycle lock to pass through each of the first and second openings and thereby secure the first end to the second end and secure the strap and the bicycle lock to the tubular member of the bicycle; and
    means located on the elongated strap for removably attaching the first end to the second end wherein the attaching means includes a pair of facing flanges, one located proximate to the first end of the strap and the other of the pair located at the second end of the strap, the pair of facing flanges each provided with a pair of openings substantially aligned with the openings of the opposite facing flange to accept a means for fastening the first end to the second end.

10. A bracket as defined in claim 9 wherein the fastening means includes a bolt and a nut.

11. A method for attaching a bicycle lock having a lock body and a cable to a tubular member of a bicycle, comprising:
    completely encircling the lock body and the tubular member of the bicycle with an elongated strap having a first end and a second end, with each of the first and second ends provided with an opening through the strap;
    aligning the openings in the first end and the second end of the strap; and
    placing a portion of the bicycle lock through the aligned openings to secure the lock to the strap and to the bicycle.

12. A method for securing a bicycle to a stationary object with a cable lock having a lock body and a cable, comprising:
    completely encircling an elongated strap around the lock body and a tubular member of the bicycle wherein said strap has a first end and a second end, the ends provided with a first opening in the first end and a second opening in the second end, wherein the strap is formed to tightly retain the lock body within the encircled strap and between the strap and the tubular member of the bicycle;
    aligning the first and second openings;
    locating the bicycle adjacent to the stationary object;
    placing the cable around at least a section of the stationary object;
    placing the cable through the aligned openings, and locking the cable lock by inserting the cable into the lock body.

13. An apparatus for attaching a lock to a post, comprising:

an elongated strap having a first end and a second end wherein the strap is shaped in a loop around the post to allow the first end to overlap the second end and further wherein a first opening is provided through the first end and a second opening is provided through the second end with the first and second openings substantially aligned;

a lock body positioned inside of the loop defined by the strap, the lock body further having a receptacle substantially aligned with the first and second openings and further having a deactivation means located in the lock body for activating and deactivating a locking mechanism;

a flexible spacer positioned inside of the loop defied by the strap and located between the post and the lock body; and a lock cable attached at a first end to the lock body and removable attachable to the receptacle by the activation ad deactivation of the locking mechanism after the lock cable is placed through the aligned openings and into the receptacle;

wherein the strap is further formed to tightly retain the lock body there within by holding the lock body tightly against the flexible spacer to compress the spacer between the lock body and the post.

14. A bracket for the attachment of a bicycle lock having a lock body and a cable to a tubular member of a bicycle, comprising:

an elongated strap having a first end and a second end and a plurality of sections wherein the strap is formed to encircle the tubular member of the bicycle and to overlap the first and second ends, wherein the overlapped first and second ends comprise a flat section of the strap, the strap further having two perpendicular sections which are substantially perpendicular to the flat section and are operatively connected to the flat section, the two perpendicular sections are connected to each other by a v-shaped section with a curved vertex, wherein the first end is provided with a first opening through the strap and the second end is provided with a second opening through the strap, wherein the strap is formed to substantially align the first opening with the second opening to permit a portion of the cable of the bicycle lock to pass through each of the first and second openings and thereby secure the first end to the second end and secure the strap and the bicycle lock to the tubular member of the bicycle, wherein the lock body is tightly retained between the strap and the tubular member of the bicycle.

* * * * *